(12) United States Patent
Sandhu et al.

(10) Patent No.: US 6,867,733 B2
(45) Date of Patent: Mar. 15, 2005

(54) METHOD AND SYSTEM FOR A PLURALITY OF MOBILE UNITS TO LOCATE ONE ANOTHER

(75) Inventors: Kulbir S. Sandhu, Fremont, CA (US); Roderic C. Fan, Fremont, CA (US); David Mleczko, San Jose, CA (US); Kenny Nguyen, Mountain View, CA (US); Carey Fan, Fremont, CA (US)

(73) Assignee: At Road, Inc., Fremont, CA (US)

( * ) Notice: Subject to any disclaimer, the term of this patent is extended or adjusted under 35 U.S.C. 154(b) by 0 days.

(21) Appl. No.: 09/829,645

(22) Filed: Apr. 9, 2001

(65) Prior Publication Data

US 2002/0145561 A1 Oct. 10, 2002

(51) Int. Cl.[7] .............................. G01S 5/14; H04Q 7/20
(52) U.S. Cl. .............................. 342/357.07; 342/357.1; 455/456.3
(58) Field of Search ........................ 342/357.07, 357.08, 342/357.09, 357.1, 457; 701/208, 213; 455/456.3, 456.5, 456.6

(56) References Cited

U.S. PATENT DOCUMENTS

| | | | | |
|---|---|---|---|---|
| 5,223,844 A | * | 6/1993 | Mansell et al. ......... | 342/357.07 |
| 5,983,161 A | * | 11/1999 | Lemelson et al. ........... | 701/301 |
| 6,115,611 A | * | 9/2000 | Kimoto et al. ............ | 455/456.3 |
| 6,131,067 A | * | 10/2000 | Girerd et al. ................ | 701/213 |
| 6,243,039 B1 | * | 6/2001 | Elliot .......................... | 342/457 |
| 6,278,921 B1 | * | 8/2001 | Harrison et al. .............. | 701/35 |
| 6,292,747 B1 | * | 9/2001 | Amro et al. ................. | 455/456 |
| 6,317,605 B1 | * | 11/2001 | Sakuma ....................... | 455/446 |
| 6,321,091 B1 | * | 11/2001 | Holland .................... | 455/414.2 |
| 6,339,745 B1 | * | 1/2002 | Novik ......................... | 701/208 |
| 6,456,852 B2 | * | 9/2002 | Bar et al. ............... | 342/357.13 |
| 2001/0027378 A1 | * | 10/2001 | Tennison et al ............ | 701/213 |
| 2001/0032236 A1 | * | 10/2001 | Lin ............................. | 701/213 |
| 2003/0013462 A1 | * | 1/2003 | Adachi ........................ | 455/456 |

FOREIGN PATENT DOCUMENTS

| | | | | |
|---|---|---|---|---|
| JP | | 10-94028 A | * 10/1998 | |
| JP | | 2001-25054 A | * 1/2001 | ............ H04Q/7/34 |

OTHER PUBLICATIONS

Schilit, Bill N. et al, "Disseminating Active Map Information to Mobile Hosts" IEEE Network, Sept/Oct. 1994, pp. 22–32.*

* cited by examiner

*Primary Examiner*—Gregory C. Issing
(74) *Attorney, Agent, or Firm*—Edward C. Kwok; MacPherson Kwok Chen & Heid LLP (57) ABSTRACT

A method and system whereby two mobile units can locate each other is presented. A user connects an interface device, such as a personal digital assistance (PDA), a wireless phone, a laptop, or a pager, to a mobile unit. The mobile unit regularly obtains its location through a location-determining technology (e.g., GPS) and sends the location to a service provider computer. The service provider computer maintains a database of the current location of all the mobile units, and provides the location of mobile units to each of the mobile units. The mobile unit communicates with the service provider wirelessly through a communication network and a data network, for example the Internet.

A user of the mobile unit can send messages to other users with a location stamp, which indicates the location of the message sender's mobile unit. In addition, a user can send a request to be notified when a target mobile unit reaches a reference point. The reference point may be defined relative to the location of the requester. Alternatively, the reference point may be an address or a landmark. Upon receiving the request, the service provider computer tracks the distance between the target mobile unit and the reference point, and sends a notification to the requester when the target mobile unit reaches the reference point.

29 Claims, 5 Drawing Sheets

| | 52 | 53 | 54 | 55 | 56 | 57 | 58 | 59 |
|---|---|---|---|---|---|---|---|---|
| | device ID# | name | residence | home phone | mobile phone | e-mail | hobbies/interests | distribution list |
| user 1 | JK5004-327 | John Smith | 123 Second Street San Jose, CA 95050 | (408) 123-4567 | (408) 987-6543 | jsmith@aol.com | salsa dancing golfing | users 2, 3, 5, 125, 127, 135, 136, 137 |
| user 2 | | | | | | | | group 1: 24-55 group 2: 133, 202, 211, 212, 222 |
| ... | | | | | | | | |
| user | | | | | | | | |
| ... | | | | | | | | |
| user n | | | | | | | | |

(column 51 = user row label)

METHOD AND SYSTEM FOR A PLURALITY OF MOBILE UNITS TO LOCATE ONE ANOTHER

BACKGROUND

1. Field of the Invention

The invention relates to a system and a method for distributing positional information and location specific messages to mobile units by using a data network.

2. Description of the Related Art

Global positioning system ("GPS") is used for obtaining position information. The GPS includes a plurality of satellites orbiting the earth and sending out, at precisely synchronized times, a code sequence that identifies the satellite. Specifically, the code sequence transmitted by each satellite is a precisely timed binary pulse train. In addition to the code sequence, these satellites send out positioning information that can be used to calculate vehicle positions. A GPS receiver retrieves the positioning information from the GPS satellites and triangulates the information to obtain the position of the receiver. A more detailed discussion of a GPS receiver is found in U.S. Pat. No. 5,990,827 to Rodric C. Fan, et al. entitled "Structure of a Position Processing Apparatus," which is herein incorporated in its entirety.

One application of GPS is vehicle location. A conventional vehicle locating system typically includes one or more ground stations and a plurality of mobile units that may be installed in vehicles. Each mobile unit is equipped with a GPS receiver and a wireless transmitter. Using the GPS receiver, a mobile unit determines the position of the vehicle in which it is installed and transmits the position to a ground station. The ground station of a conventional vehicle locating system normally includes a map database search system and some type of storage medium that stores digital maps and travel-related information. Thus, upon receiving the vehicle positions from the mobile units, the ground station combines the stored data with the received information and displays the present vehicle positions on a digital map.

In some cases, a data network, such as the Internet, is involved in locating mobile units. When a data network is involved, the mobile units determine the vehicle positions and transmit the position information to the network server. This data transmission from a mobile unit to the network server is accomplished wirelessly by, for example, cellular digital packet data network (CDPD) that connects to a data network (e.g., the Internet), which in turn provides access to the network server. In some cases, the mobile units may transmit raw data to the network server so that the network server can make the position determination. In a system that involves a network server, the data storage medium may be accessed by the network server instead of the ground station. The data storage medium contains travel-related information such as maps, traffic conditions, positions of service stations, and destinations of interest. Thus, the data processing unit organizes the measured position and generates an area map. The area map indicates by a position marker the position of each mobile unit.

As mentioned above, vehicles can connect to data networks (e.g., the Internet) wirelessly through communication networks, for example a CDPD network. CDPD networks consist of Mobile Data Intermediate Systems (MDISs), Mobile Data Base Stations (MDBSs), and Mobile End Stations (MESs). An MDBS offering CDPD services helps a roaming MES register with the MDIS with which the particular MDBS is associated by acting as a conduit for the registration message. An MDIS that handles the registration is referred to as the serving MDIS. Upon receiving the registration message from the MDBS, the serving MDIS informs the home MDIS of the MES of the latter's presence in its coverage area. When a host needs to send data to an MES, it does not have to be aware of the mobility aspect of the MES; it simply transmits data using the MES's IP address as the destination address. The encapsulated data packets for the MES are forwarded to the serving MDIS of the MES. At the serving MDIS, packets are decapsulated to reveal the MES's address. The serving MDIS sends the original data packets to the right channel where the MES is currently located. The MES receives the data packets. If the MES needs to reply, it directly sends data packets using the remote host's IP address as the destination address. CDPD systems are further described in K. Budka et al., "Cellular Digital Packet Data Networks," Bell Labs Technical Journal, Vol. 2, No. 3 (Summer 1997); "Cellular Digital Packet Data Systems Specification: Relases 1.1," CDPD Forum, Inc., Chicago (1995); and M. S. Taylor et al., "Internet Mobility: The CDPD Approach," Prentice Hall PTR, Upper Saddle River, N.J. (1996).

The vehicle locating system described above, while useful for tracking the fleet of a trucking company or a moving company, is limited in that the positions of the vehicles can only be obtained from a ground station. A member of the fleet cannot use the above vehicle locating system to obtain vehicle position information of other fleet members. A method and system that allows one member of the fleet to obtain vehicle position information of other members of the fleet from a place other than the ground station is needed.

SUMMARY OF THE INVENTION

The present invention includes a system and a method for a mobile user to obtain the location of another mobile user. A mobile unit tracks its own location through a location-determining technology, for example GPS, time difference of arrival (TDOA), or angle of arrival (AOA). In addition, the mobile unit receives input from users. The mobile unit encapsulates the location data and the user input in an outbound package, and transmits the outbound package to a service provider via a communication network and a data network (e.g., the Internet). The service provider is a computer that maintains a database of the current location of all the mobile units registered with the service provider. The database can be accessed by any of the mobile units registered with the service provider.

Upon receiving the outbound package from a mobile unit, the service provider categorizes the content of the outbound package into user profile data, announcements, and requests. User profile data includes personal information that is not location-specific, such as name, e-mail address, telephone number, and hobbies of a user. The service provider uses the user profile data to either set up a new account in the database or to modify a pre-existing piece of information in the database. Optionally, the service provider searches the database for a matching entry, and provides the user with a list of other users who have a similar user profile. If the outbound package contains an announcement, the service provider forwards the announcement to the proper recipients indicated in the outbound package, with a location stamp indicating the location of the sender mobile unit. The outbound package may contain a request, either in addition to or instead of an announcement. A request may be a request for the location of another user, or a request to be notified if a geographical parameter is met. In response to the former type of request, the service provider sends back a response package containing the current location of the specified user. In response to the latter type of request, the service provider monitors the location of the relevant mobile unit(s) until either the parameter is met or the user sends another outbound package telling the service provider to stop the monitoring. When the parameter is met, the service provider sends a notification to the requester mobile unit in the form of a response package. Depending on the user interface device, the notification may include sound, text, flashing lights, or graphics.

DETAILED DESCRIPTION OF THE INVENTION

Figure 1:
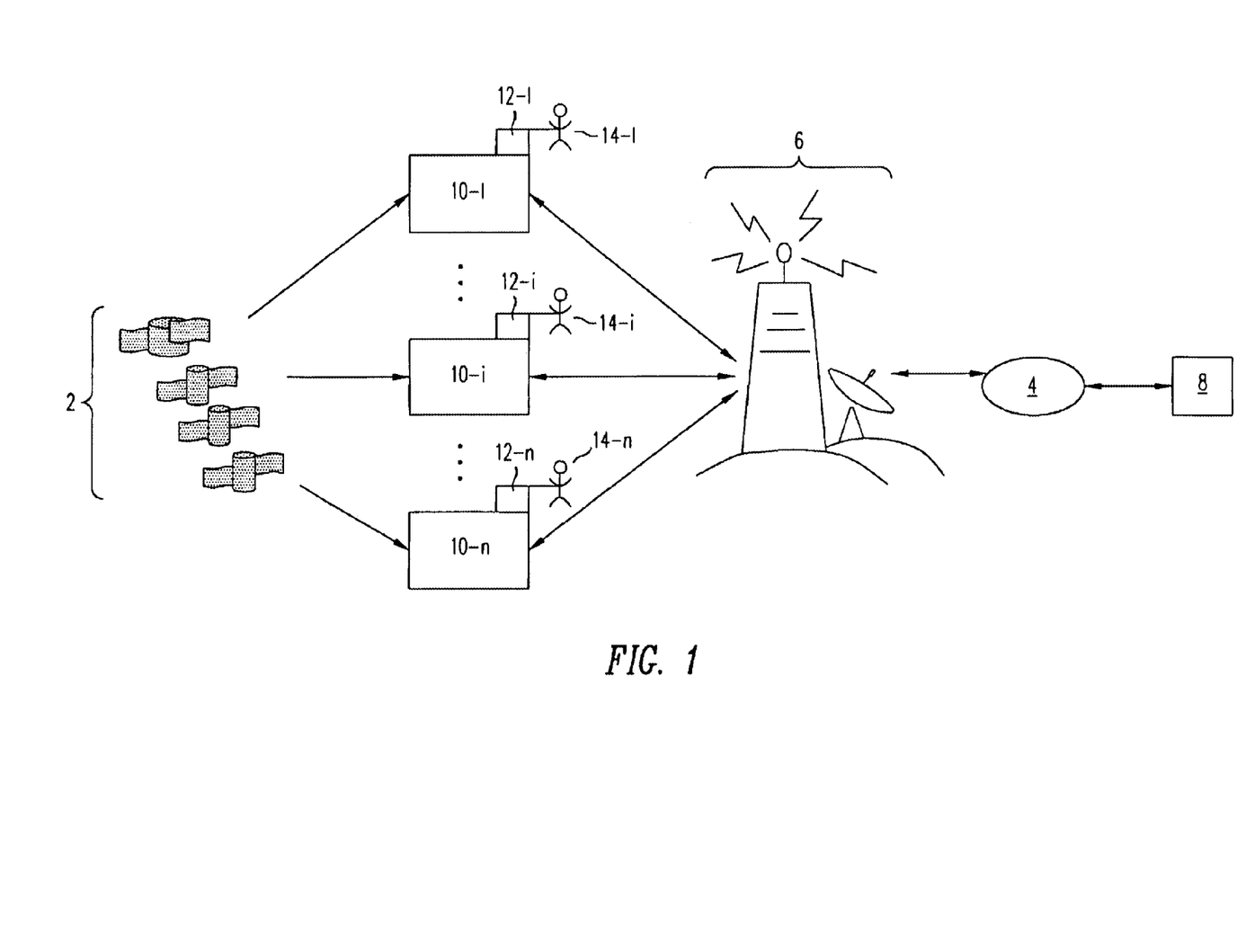
FIG. 1 depicts a location-specific peer-to-peer communication system in accordance with the present invention.

FIG. 1 provides an overview of the location-specific peer-to-peer communication system in accordance with the present invention. The system includes GPS satellites 2, data network 4, server 6, communication network 6, service provider 8, and mobile units 10-1 through 10-n where n is the total number of mobile units in the system. Mobile units 10-1 through 10-n are connected to user interface device 12-1 through 12-n, respectively. Users 14-1 through 14-n transmit information to and receive information from mobile units 10-1 through 10-n through user interface device 12-1 through 12-n, respectively.

As used herein, mobile unit 10-i refers to one mobile unit of mobile units 10-1 through 10-n and user interface device 12-i refers to the user interface device that is connected to mobile unit 10-i. Mobile units 10-1 through 10-n receive code sequences from GPS satellites 2 and convert the code sequences to location data. In addition, mobile units 10-1 through 10-n receive information from users 14-1 through 14-n, respectively. User 14-i enters announcements and requests into mobile unit 10-i through user interface device 12-i, which then combines the received announcements and requests with location data into an outbound package. In some embodiments, for example if user interface device 12-i is a laptop or a personal digital assistant that allows Internet access, user 14-i may be able to enter user profile data through user interface device 12-i as well. Mobile unit 10-i transmits the outbound package to communication network 6. Outbound package, as used herein, refers to information that originates in user interface device 12-i and travels through communication network 6 and data network 4 to reach service provider 8. Information that originates in service provider 8 and travels to mobile unit 10-i is referred to as a response package. Mobile unit 10-i receives a response package, reformats it for user interface device 12-i, and passes it to user interface device 12-i. Communication network 6 includes but is not limited to CDPD, GSM, iDEN, AMPS, or CDMA. Data network 4 is a communication network that can also store and maintain data, such as the Internet.

User 14-i enters announcements and requests into mobile unit 10-i through user interface device 12-i, and also retrieves any information encapsulated in the response package through user interface devices 12-i. User interface device 12-1 through 12-n include but is not limited to wireless telephone, laptop, personal digital assistant, and pager. Thus, after retrieving information from mobile unit 10-i, user 14-i may contact another user, e.g. user 14-n, directly without using data network 4. For example, if user interface device 14 is a wireless phone, user 14-i may call user 14-n. Alternatively, if user interface device 14 is a laptop, user 14-i may communicate with user 14-n by e-mail or instant messaging.

Figure 2:
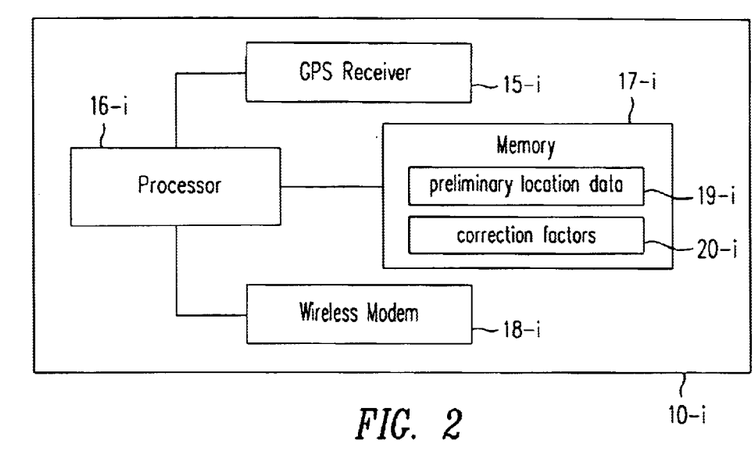
FIG. 2 depicts the components of a mobile unit that provides the location data in accordance with the present invention.

FIG. 2 shows the components of mobile unit 10-i. Mobile unit 10-i is a portable unit that can be used independently, installed in a vehicle or a cellular phone, or clipped onto a watch or a belt. As shown in FIG. 2, mobile unit 10-i includes GPS receiver 15-i, processor 16-i, memory 17-i, and wireless modem 18-i. GPS receiver 15-i tunes into the frequency at which GPS satellites 2 transmit information, and receives GPS code sequences. GPS receiver 15-i forwards the GPS code sequences to processor 16-i, which converts the GPS code sequences to location data. Processor 16-i uses triangulation to convert the GPS code sequences to preliminary location data by first converting the GPS code sequences, and then applying the correction factors to obtain location data such as a street address or latitude, longitude, and altitude. Memory 17-i includes preliminary location data 19-i and correction factor 20-i.

The location data derived from GPS code sequences are stored in memory 17-i. If further calculation is necessary to convert the location data (e.g., latitude, longitude, and maybe altitude) into street address, processor 16-i executes the necessary calculation before storing the values in memory 17-i.

Processor 16-i uses correction factors 20-i, e.g., delta-pseudo-ranges, to obtain the actual locations (and optionally velocities) of mobile units 10-1 through 10-n. The correction factors, which depend on the geographical zone in which mobile unit 10-i is located, are obtained from remote correction stations (not shown). Processor 16-i can connect to the remote correction stations via wired or wireless communication links, or via a data network such as data network 4. Using the correction factors received from the remote correction stations and the GPS code sequences, processor 16-i of mobile unit 10-i derives the street addresses and the velocities of mobile units 10-1 through 10-n. The location data may be updated as frequently as mobile unit 10-i receives the GPS code sequences, or at a designated interval such as every two seconds. Further details on the calculation of location data are provided in U.S. Pat. No. 5,959,577 to Rodric C. Fan, et. al. entitled "Method and Structure for Distribution of Travel Information Using Network," which is herein incorporated in its entirety. Processor 16-i reformats the location data to an appropriate protocol, e.g., UDP/IP, combines the location data with the information entered by user 14-i, and sends the outbound package to communication network 6 via wireless modem 18-i. Processor 16-i tracks the location of mobile unit 10-i frequently (e.g., every few seconds) by receiving the GPS code sequence, deriving the location data, and sending the location data to service provider 8. The frequent updating of the location data allows every outbound package to have a time stamp and a "location stamp" designating the location of mobile unit 10-i at the time the outbound package was sent. Further details on location stamp is provided in U.S. patent application Ser. No. 09/696,446 to Carey B. Fan, et. al. entitled "Location Authentication Stamp Attached to Messages," which is incorporated herein in its entirety. A processor such as Motorola's MC68331 maybe used for processor 16-i.

Figure 3:
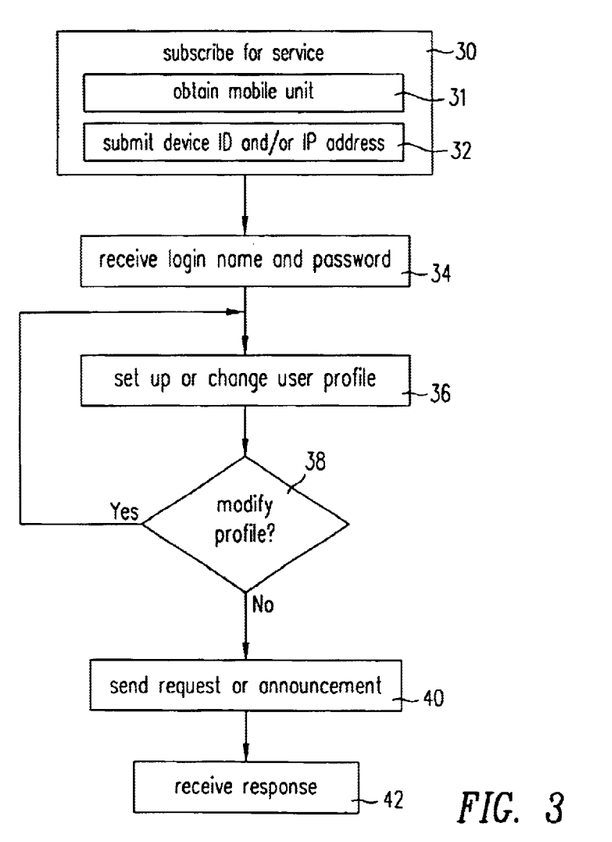
FIG. 3 depicts a flowchart of the registration process through which a user becomes a part of the communication system in accordance with the present invention.

FIG. 3 shows the initial registration process through which users 14-1 through 14-n become a part of the system in accordance with the present invention. As indicated by block 30, the registration process begins with the subscription process. Block 31 indicates that the subscription process includes physically obtaining mobile unit 10-i, for example by purchasing. Block 32 indicates that the subscription process also includes submitting a unique device identification number and/or device IP address to service provider 8. Depending on the embodiment, user 14-i sends the unique device identification number and/or device IP address to service provider 8 by mail, telephone, computer, or user interface device 12-i. Service provider 8 receives the device identification number and/or device IP address and assigns user 14-i a login name and a password, as indicated by block 34. As indicated by block 36, user 14-i uses the login name and the password to set up her user profile with service provider 8 through data network 4. User profile includes personal information such as name, e-mail address, residential address, mobile phone number, and landline phone number. In addition, user profile may include hobbies and interests of user 14-i and distribution groups. Distribution groups are further explained below. As shown by block 38, user 14-i can modify her user profile as she desires. Optionally, the user profile modification may allow user 14-i to change her password.

User 14-i, who registers with the system in accordance with the present invention, can access the location of all other users who are registered with the system. However, user 14-i may wish to limit the data exchange to a sub-group of users, such as friends, coworkers, and family. User 14-i can limit the data exchange to a sub-group of users by defining a distribution group in the user profile. A distribution group includes a list of users, and user 14-i can create as many distribution groups as she wishes. For example, user 14-i may create a first distribution group including all co-workers, a second distribution group including only the co-workers in his project team, and a third distribution including his Saturday night poker group. Then, if user 14-i can direct a request or an announcement to one or more of the distribution groups. Similarly, user 14-i can limit those who can access her current location to those in one or more distribution groups.

After user 14-i registers with the system, all other users have access to the location of user 14-i. In some embodiments, user 14-i is provided with a "hide" option in the user profile such that if user 14-i opts to "hide," users who normally have access the current location of user 14-i is blocked from accessing the current location of user 14-i. Some embodiments may allow user 14-i to specify a list of users from whom she wants to "hide. If user 14-i chooses to "hide" from users 14-2 through 14-5, for example, service provider 8 does not provide users 14-2 through 14-5 with the location of user 14-i even if users 14-2 through 14-5 request the location of user 14-i. Instead of providing the location of user 14-i, service provider 8 might send a message that the location of user 14-i is unavailable.

After user 14-i sets up a user profile in service provider 8, user 14-i can access the location data of other users by sending outbound packages, as indicated in block 40, and receiving response packages, as indicated in block 42. Block 40 indicates that user 14-i can send a request or an announcement to service provider 8. In the simplest case, a request can be a request for the current location of another user. Requests and announcements may be entered through user interface device 12-i or directly to data network 4, depending on the embodiment. A request can entail specifying a geographical parameter and asking service provider 8 to send a notification if the geographical parameter is met. The geographical parameter may be a pre-defined distance relative to user 14-i. For example, user 14-i may request to be notified if any user in one of his distribution groups comes within a ten-mile radius. Alternatively, the geographical parameter may be defined independently of the location of user 14-i. For example, user 14-i may request to be notified if user 14-2 crosses a specific zip code, passes a landmark, or arrives at a specific intersection or restaurant. In that case, service provider 8 sends user 14-i a response package containing a notification when the condition is satisfied.

Figure 4:
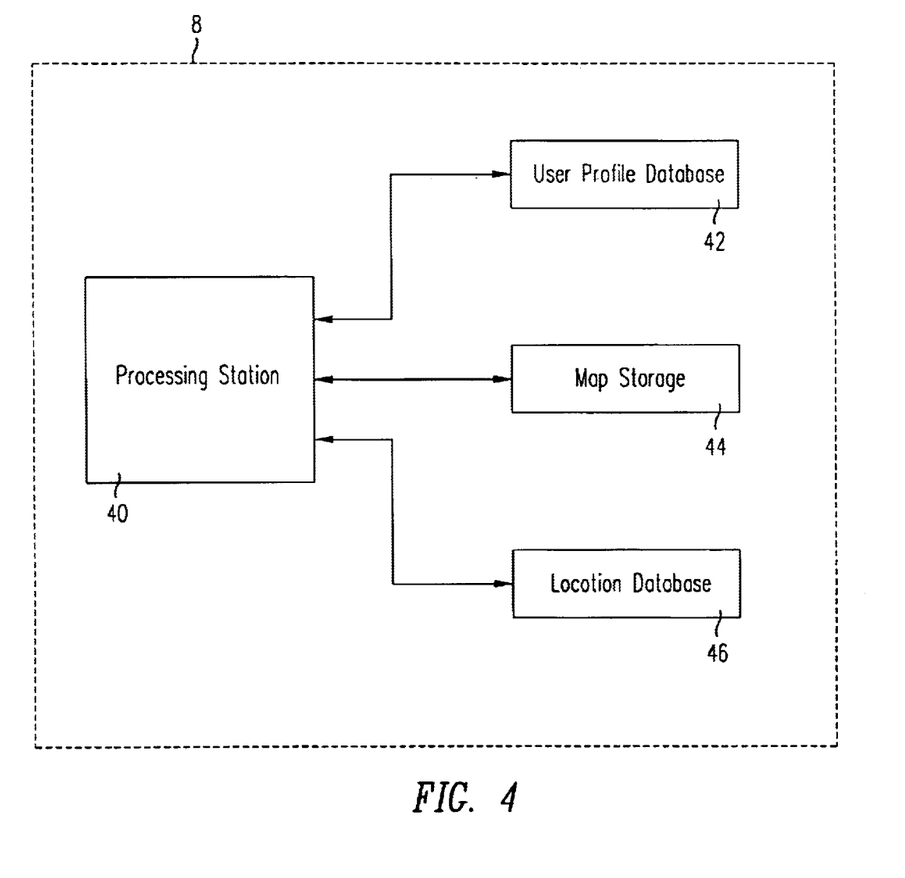
FIG. 4 depicts the components of a service provider computer in accordance with the present invention.

FIG. 4 shows the components of service provider 8. Service provider 8 may be a computer or a server linked to data network 4. Service provider 8 includes processing station 40, user profile database 42, map storage 44, and location database 46. User profile database 42 stores the user profiles of all users 14-1 through 14-n. If a user modifies his/her user profile, processing station 40 updates user profile database 42 accordingly. Map storage 44 stores maps of the geographical area covered by service provider 8. Map storage 44 allows user 14-i to see a map of the relevant area if desired. For example, if user 14-i requests to be notified if user 14-2 is within a ten-mile radius, processing station 40 may provide user 14-i with a map showing the location of user 14-2 relative to the location of user 14-i. Location database 46 contains data that is more frequently updated than user profile data, such as the locations of mobile units 10-1 through 10-n. As mentioned above, location data may be updated as frequently as every two seconds. When users make requests, the geographical parameters may be stored in location database 46 as well. Similarly, when users make announcements, the content of the announcements may be stored in location database 46.

User profile database 42, map storage 44, and location database 44 may be implemented using any mass storage media, such as hard disks, RAMs, ROMs, CD-ROMs, and magnetic tapes. Infrequently updated information, such as maps or user profile, may be stored on CD-ROMs. On the other hand, frequently updated information, such as location data, may be stored on RAM.

Figure 5:
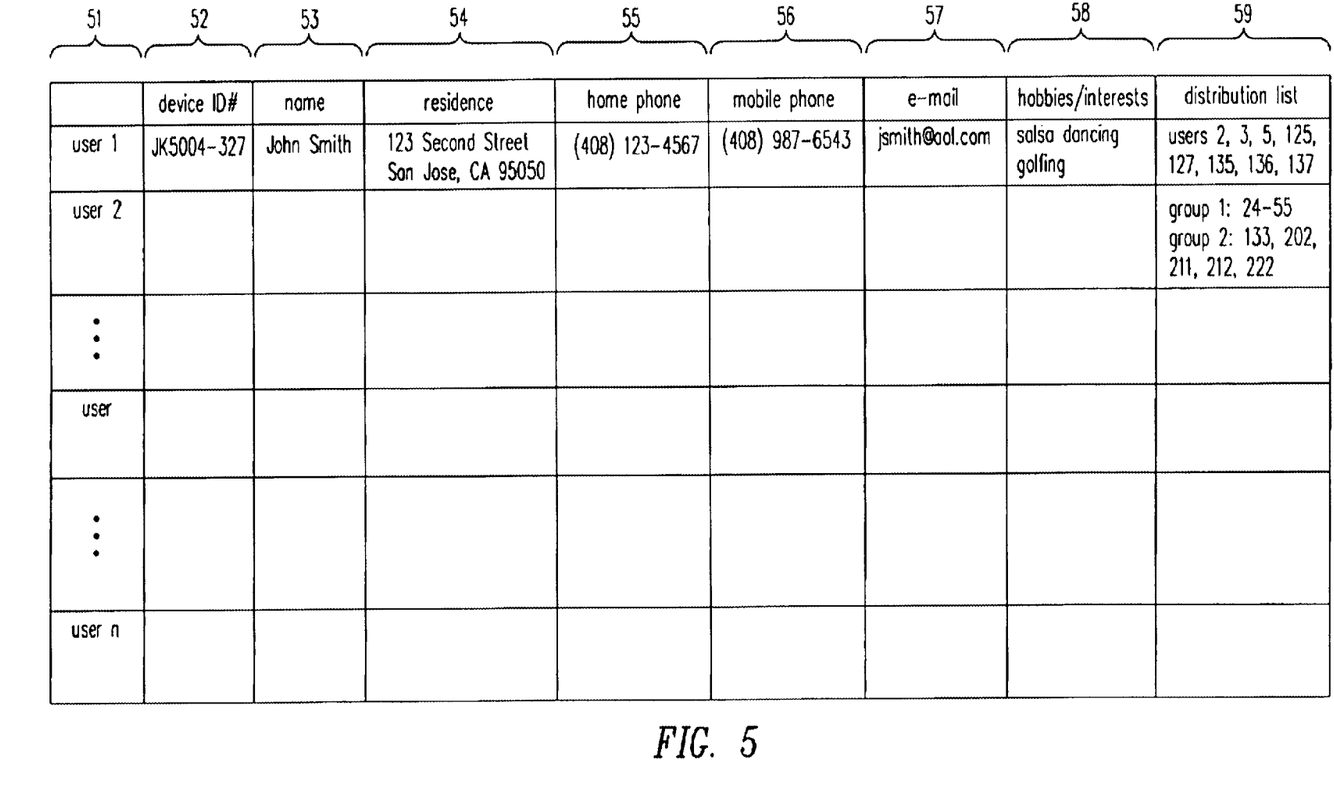
FIG. 5 depicts an exemplary table of user profiles that maintains personal information of all users of the system.

In some embodiments, user profile database 42 may store the user profiles in a table format. FIG. 5 shows exemplary table 50 which may be used to store the user profiles in user profile database 42. Table 50 stores personal information such as name, residential address, home telephone number, mobile telephone number, e-mail address, hobbies, and distribution lists, as shown by columns 53, 54, 55, 56, 57, 58, and 59. The exemplary table 50 in FIG. 5 indexes the information by user numbers, as shown in column 51. Other embodiments may index the personal information by device identification number (column 53) or by IP address (not shown). Location database 46 may be indexed similarly.

Figure 6:
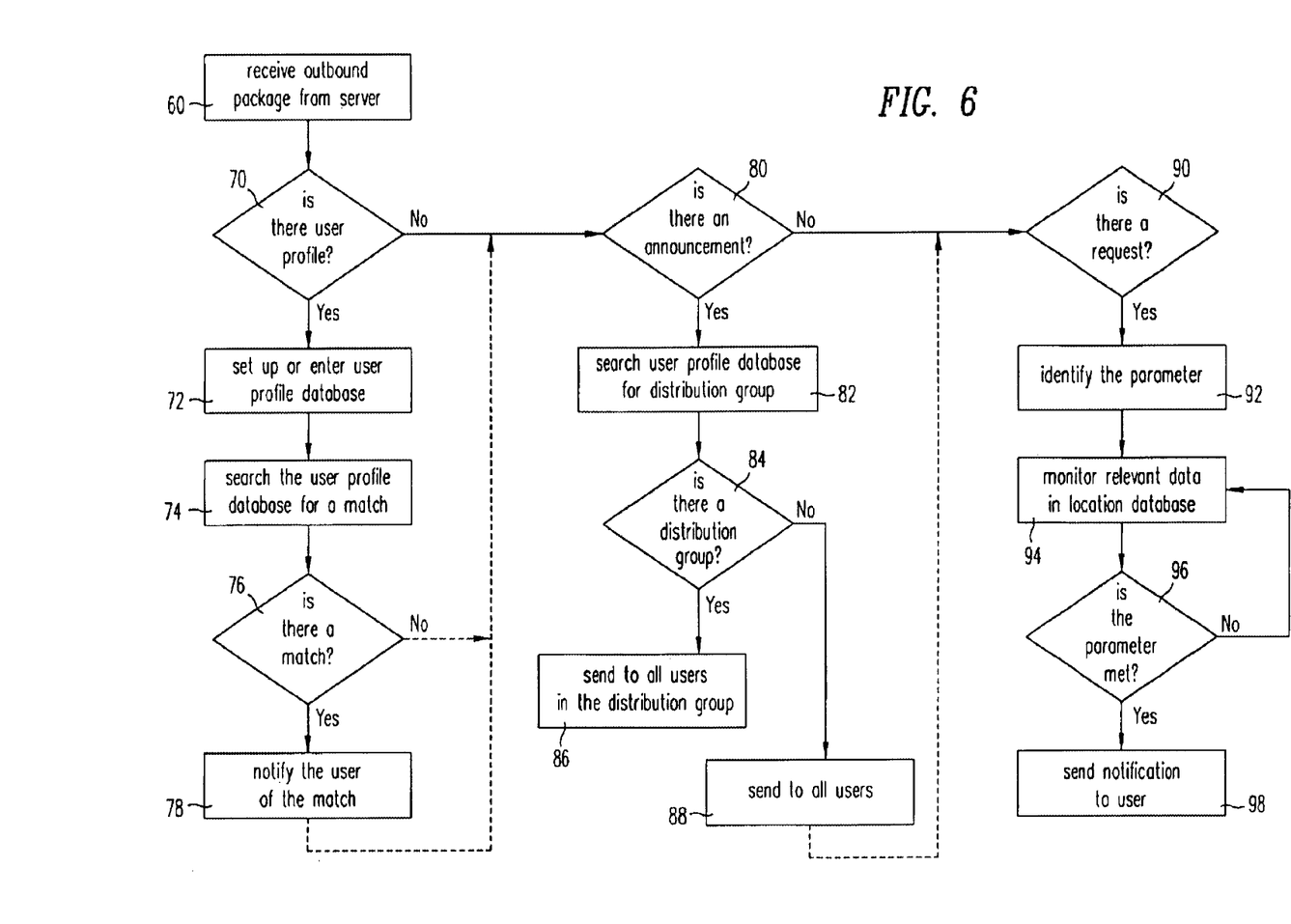
FIG. 6 depicts a flowchart of the response-package creation process executed by the service provider computer in response to an outbound package from a user.

FIG. 6 illustrates the functions of service provider 8. Upon receiving an outbound package (block 60) from a sender, processing station 40 sorts the data encapsulated in the outbound package into user profile, announcements, and requests, as indicated in blocks 70, 80, and 90. If the outbound package contains user profile data, processing station 40 accesses user profile database 42 to enter the newly-received user profile. As indicated in block 72, if the sender is a new user, processing station 40 creates a new entry for the sender and stores the received user profile for the sender. If the sender is a user who previously set up a user profile, processing station 40 updates the user profile data for the sender. In some embodiments, processing station 40 scans user profile database and looks for a matching entry when entering or modifying a user profile, as indicated in block 74. A matching entry may be, for example, other users who share the same hobbies and interests, or other users who live in the same neighborhood as the sender. Processing station 40 may find a match by looking for a matching word in every row of the exemplary table 50 (FIG. 5). Upon finding a match (block 76), processing station 40 creates a response package to the sender and transmits to data network 4 a list of users found to have matching entries, as indicated in block 78. If there is no match, processing station 40 may send a response package stating that there is no match and move on to other parts of the outbound package received in block 60.

Blocks 82 and 84 indicate that if the outbound package received in block 60 contains an announcement, processing station 40 accesses user profile database 42 and checks to see if the sender specified a distribution group, either previously or in the outbound package. If there is a distribution group, processing station 40 sends the announcement to all the users in the distribution group, as indicated in block 86. If there is more than one distribution group, the outbound package should indicate the distribution group to which the announcement should be sent. If there is no distribution group or the outbound package specifies no distribution group, processing station 40 sends the announcement to all users, as indicated in block 88. All announcements sent can contain a location stamp indicating the current location of the sender. Thus, if the announcement is "meet for dinner at 7 p.m. in Restaurant X," a recipient of the announcement can see the location of the sender. If the sender is in the vicinity of the recipient, the recipient may contact the sender and ask to share a ride.

If the outbound package received in block 60 contains a request, block 92 indicates that processing station 42 identifies the parameter specified by the sender. In the simplest request, the parameter may include only the name of a target user whose location the sender wants to know. Upon receiving such request, service provider 8 retrieves the current location of the target user from location database and transmits it to the sender in a response package. A request may include a geographical parameter in addition to the name of a target user. If, for example, the geographical parameter is "within a 10-mile radius," processing station 40 accesses location database 46 to obtain the location of the target user and the location of the sender and monitors the two locations (block 94). Processor 40 uses map storage 44 to determine the distance between the target user and the sender every time new location data is entered (e.g., every two seconds), as indicated in block 96. When the location between the sender and the target user are within the specified geographical parameter, which is within ten miles of each other in this example, processing station 40 transmits a response package to the sender. The response package, which contains a notification, is transmitted to data network 4. Data network 4 forwards the notification to communication network 6, which transmits the notification to mobile unit 10-i. The sender receives the notification from mobile unit 10-i through user interface device 12-i.

In the simple case where the request only contains the identity of a target user whose location the sender wishes to know, the notification contains the current location of the target user. If the request contained a geographical parameter (e.g., within a 10-mile radius), the notification may be a beep or a flashing text. Any notification may include sound, flashing lights, text, or graphics depending on the embodiment and user interface device 12-i. Upon receiving the notification, the sender (user 14-i) may take a responsive action, for example by directly contacting the target user. The user-to-user (peer-to-peer) communication may be in the form of a phone call, e-mail, instant messaging, or chatting. If the user-to-user communication involves user interface device 14-i, the exchanged messages may have a location stamp even if the communication does not involve service provider 8, because mobile unit 10-i derives and stores location data.

While the present invention is illustrated with particular embodiments, it is not intended that the scope of the invention be limited to the specific and preferred embodiments illustrated and described. For example, although the disclosed embodiments refer to GPS as the location-identification method used, other methods such as time difference of arrival (TDOA), angle of arrival (AOA), ray tracing/pattern recognition, and hybrid methods using network connections may be used.

What is claimed is:

1. A method of providing the location of a second mobile unit to a first mobile unit, said method comprising:

maintaining personal profiles each associated with a user of one of said first and second mobile units, each personal profile specifying an access condition under which another user may access that personal profile;

receiving from said first mobile unit a first packet including a current location of said first mobile unit;

receiving from said second mobile unit a second packet including a current location of said second mobile unit;

storing said current locations in a database;

receiving a request from a user of said first mobile unit specifying a condition based on said current location of said first mobile unit or a future location of said first mobile unit; and upon ascertaining that said user of said first mobile unit satisfies said access condition in the user profile of a user associated with said second mobile unit, transmitting a data package to said first mobile unit in response to a said request from said first mobile unit upon satisfaction of said condition, wherein said data package comprises said current location of said second mobile unit retrieved from said database.

2. The method of claim 1, wherein said receiving and said storing of current locations are repeated at a regular time interval.

3. The method of claim 1, wherein said first packet includes said request, and wherein, prior to said transmitting, said method further comprises:

obtaining the current location of said second mobile unit from said database; and including in said data package said current location of said second mobile unit.

4. The method of claim 1, wherein said request comprises a request for a notification when said second mobile unit arrives at a reference point, and wherein, prior to said transmitting, said method further comprises:

calculating a distance between said second mobile unit and said reference point; and including a notification to said data package when said distance is approximately zero.

5. The method of claim 4, wherein said notification comprises at least one of:
   sound;
   flashing light;
   text; and
   graphics.

6. The method of claim 1, wherein said receiving and said transmitting are done through a data network.

7. The method of claim 6, wherein said data network comprises the Internet.

8. The method of claim 6, wherein said data network comprises a wireless communication network, said wireless communication network being selected from a group consisting of CDPD, CDMA, GSM, iDEN, and AMPS.

9. The method of claim 1, wherein said transmitting a data package is carried out based on the satisfaction of the condition that said second mobile unit has not requested that said first mobile unit be excluded from a group of potential recipients of said data package.

10. A method comprising:
    maintaining personal profiles each associated with a user of a mobile unit, each personal profile specifying an access condition under which a user of another mobile unit may access that personal profile;
    receiving from a first mobile unit units a first packet including a request for access to personal profiles of users of said mobile units that satisfy a specified selection criterion and a current location of said first mobile unit, said first packet further providing at least one of:
       personal information about a first user, said first user being a user of said first mobile unit; and
       an announcement;
    storing said current locations in a database; and
    upon ascertaining that said user of said first mobile unit satisfies the access conditions associated with the personal profiles of one or more users of said mobile units that satisfy the specified selection criterion, transmitting a data package in response to said request from said first mobile unit.

11. The method of claim 10, wherein said data package comprises a list of mobile units used by users having similar personal information in their personal profile as said personal information of said first user.

12. The method of claim 10, wherein said first packet provides an announcement and a list of recipients, and wherein said data package comprises:
    said announcement; and
    a location stamp showing the location of said first mobile unit.

13. The method of claim 10, wherein said personal information comprises at least one of:
    name of said first user;
    telephone number of said first user;
    address of said first user;
    e-mail address of said first user; and
    hobbies of said first user.

14. An apparatus for tracking the location of a second mobile unit from a first mobile unit, said apparatus comprising:
    a processing station that receives location data from said first and second mobile units;
    a database of said location data connected to said processing station; and
    a data network through which packets are sent between said processing station and said first and said second mobile units, wherein said packets comprise a current location of said second mobile unit being sent from said processing station to said first mobile unit in response to a request from said first mobile unit, upon satisfaction of a search criterion specified in said request and after ascertaining that said first mobile unit has a right to receive said current location of said second mobile unit.

15. The apparatus of method 14, further comprising a map storage connected to said processing station.

16. The apparatus of method 14, wherein said packets comprise a current location of said first mobile unit and a current location of said second mobile units being sent from said first and second mobile units, respectively, to said processing station at regular time interval.

17. The apparatus of method 14, wherein said data network comprises the Internet.

18. A method of providing the current location of a second mobile unit to a first mobile unit, said method comprising:
    maintaining access control data indicating an access condition under which information regarding said second mobile unit may be accessed by another mobile unit;
    said first mobile unit transmitting a first packet to a service provider computer, said first packet indicating the current location of said first mobile unit;
    said second mobile unit transmitting a second packet to said service provider computer, said second signal indicating the current location of said second mobile unit;
    said service provider computer receiving said first and second signals and storing said current locations of said first and said second mobile units in a database;
    said service provider computer receiving from said first mobile unit a request including a condition based upon said current location of said first mobile unit or a future location of said first mobile unit, and retrieving said current location of said second mobile unit from said database in response to a request from said first mobile unit; and
    said service provider computer, upon satisfaction of said condition and upon ascertaining from said access control data that said first mobile unit satisfies said access condition, transmitting said current location of said second mobile unit to said first mobile unit.

19. The method of claim 18, wherein said transmitting is done through the Internet and a data network, said data network selected from a group consisting of CDPD, CDMA, GSM, iDEN, and AMPS.

20. The method of claim 18, wherein said request comprises a request to be notified when said second mobile unit arrives at a reference point, said method further comprising:
    said service provider computer calculating the distance between said current location of said second mobile unit and said reference point, and
    said service provider computer sending a notification to said first mobile unit when said distance is approximately zero.

21. A system, comprising:
    a first mobile unit and a second mobile unit connected to a data network; and
    a processing station connected to said data network and receiving current locations over said data network from said first and second mobile units, the processing station (a) maintaining an access control list including an access condition under which information regarding said second mobile unit may be accessed by another mobile unit; (b) being connected to a database storing said current locations of said first and second mobile units, and; (c) upon request from the first mobile unit and upon satisfaction of a condition based on said current location or a future location of said first mobile unit and said access condition, providing the first mobile unit the stored current location of the second mobile unit.

22. The system of claim 21 wherein each of said first and second mobile units comprises:

a GPS receiver for receiving GPS code sequences;

a processor that converts said GPS code sequences to location data;

a memory containing conversion data for converting said GPS code sequences to location data; and a wireless modem connecting said first and said second mobile unit to said data network.

23. The system of claim 22 wherein said conversion data comprises:

preliminary location data; and correction factors.

24. The system of claim 22, wherein each of said first and second mobile units comprises a plurality of mobile units.

25. The system of claim 21, each of said first and second mobile units further comprising a user interface device connected to each of said first and second mobile units, said user interface device selected from a group consisting of personal digital assistant, laptop, wireless phone, and pager.

26. The system of claim 25, said user interface conveying at least one of:

sound;

flashing light;

text; and graphics.

27. The system of claim 21, wherein said data network comprises the Internet.

28. The system of claim 21, wherein said data network comprises a wireless communication network selected from a group consisting of CDPD, CDMA, GSM, 15 AMPS, and iDEN.

29. The system of claim 21, wherein said database comprises:

a storage for personal information of users;

a map storage; and a storage for the current locations of said first and second mobile units.

* * * * *

UNITED STATES PATENT AND TRADEMARK OFFICE
CERTIFICATE OF CORRECTION

PATENT NO. : 6,867,733 B2
DATED : March 15, 2005
INVENTOR(S) : Kulbir S. Sandhu et al.

It is certified that error appears in the above-identified patent and that said Letters Patent is hereby corrected as shown below:

Column 9,
Line 28, delete "units".

Signed and Sealed this

Fourth Day of October, 2005

JON W. DUDAS
*Director of the United States Patent and Trademark Office*